(12) United States Patent
Chen et al.

(10) Patent No.: US 10,196,757 B1
(45) Date of Patent: Feb. 5, 2019

(54) INTEGRATED SYSTEM FOR NANOFIBER PRODUCTION

(71) Applicants: Xing Chen, Plainfield, IL (US); Garrett L. Grocke, Twin Lakes, WI (US); Viktor Vajda, Lisle, IL (US); Ziyao Zhou, Woodridge, IL (US)

(72) Inventors: Xing Chen, Plainfield, IL (US); Garrett L. Grocke, Twin Lakes, WI (US); Viktor Vajda, Lisle, IL (US); Ziyao Zhou, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 279 days.

(21) Appl. No.: 15/203,943

(22) Filed: Jul. 7, 2016

Related U.S. Application Data

(63) Continuation of application No. 14/665,932, filed on Mar. 23, 2015.

(51) Int. Cl.
*D01D 5/00* (2006.01)

(52) U.S. Cl.
CPC ......... *D01D 5/0076* (2013.01); *D01D 5/0061* (2013.01); *D01D 5/0084* (2013.01); *D01D 5/0092* (2013.01)

(58) Field of Classification Search
CPC .. D01D 5/0061; D01D 5/0069; D01D 5/0076; D01D 5/0092
(Continued)

(56) References Cited

U.S. PATENT DOCUMENTS 3,223,757 A * 12/1965 Owens ................. B29C 47/887
264/216
4,718,257 A * 1/1988 Reinehr .................... D06C 7/00
68/5 D
(Continued)

OTHER PUBLICATIONS

Xing Chen, et al., "Fabrication, Formation Mechanism, and Magnetic Properties of Metal Oxide Nanotubes via Electrospinning and Thermal Treatment," J. Phys. Chem C 2011, 115, pp. 373-378.

*Primary Examiner* — Timothy Kennedy
(74) *Attorney, Agent, or Firm* — Cherskov Flaynik & Gurda, LLC

(57) ABSTRACT

The invention provides a system for producing nanotubes, nanofibers and nanorods, the system comprising a wire array shaped as a cylinder such that the cylinder defines a void; a first furnace positioned within the void; a second furnace positioned opposite the first furnace to define a channel adapted to receive a portion of the cylinder as the cylinder rotates about its axis; a device for depositing spun fiber onto the wire array as the cylinder rotates; and a device for removing the deposited fiber from the array after the deposited fiber is heated within the channel. The invention also provides a method for producing nanotubes, the method comprising: supplying a cylindrical wire array, wherein the array defines an internal void; positioning a first furnace within the void; positioning a second furnace opposite the first furnace so as to define a channel between the first furnace and second furnace, the channel adapted to receive a portion of the cylindrical array as the array rotates about its axis; depositing spun fiber onto the array as the array rotates; heating the deposited fiber as it enters the channel; and removing the deposited fiber as it exits the channel.

20 Claims, 9 Drawing Sheets
(1 of 9 Drawing Sheet(s) Filed in Color)

(58) Field of Classification Search
USPC .............. 264/465, 484; 425/174.6, 174.8 R, 425/174.8 E
See application file for complete search history.

(56) References Cited

U.S. PATENT DOCUMENTS

| | | | | |
|---|---|---|---|---|
| 5,427,021 | A | * | 6/1995 | Conrad ................ D21G 1/0093 100/168 |
| 5,667,562 | A | * | 9/1997 | Midkiff .............. B01D 39/1623 15/347 |
| 6,221,301 | B1 | * | 4/2001 | Tsunashima .......... B29C 33/044 264/210.5 |
| 6,375,773 | B1 | * | 4/2002 | Andersen ................ D04H 1/12 156/148 |
| 2008/0018012 | A1 | * | 1/2008 | Lemaire ................ B82Y 30/00 264/82 |
| 2012/0183638 | A1 | * | 7/2012 | Syba .................... D01D 5/0069 425/174.8 E |
| 2014/0284827 | A1 | * | 9/2014 | Pokorny ............. D01D 5/0076 264/6 |

\* cited by examiner

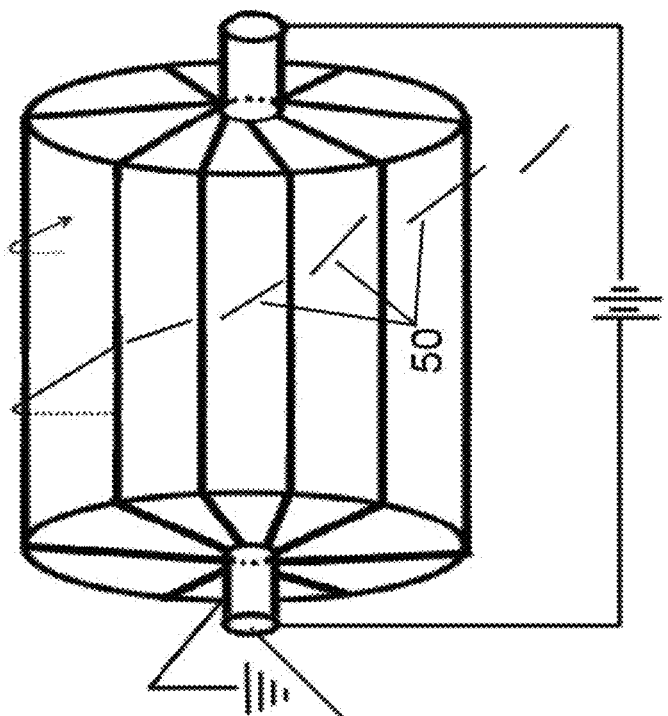
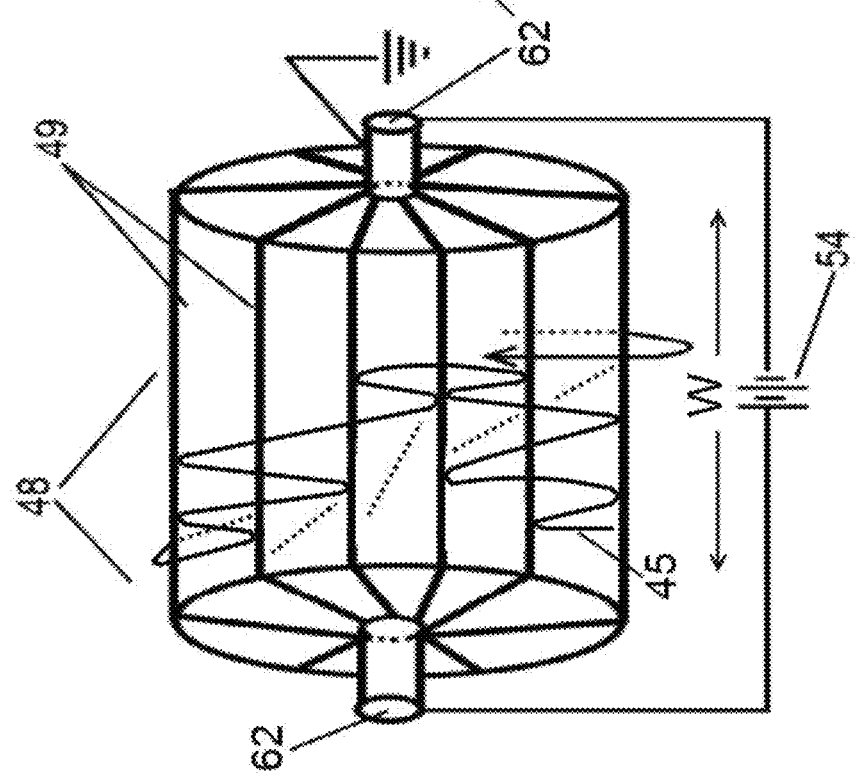
Fig. 3B
Fig. 3A

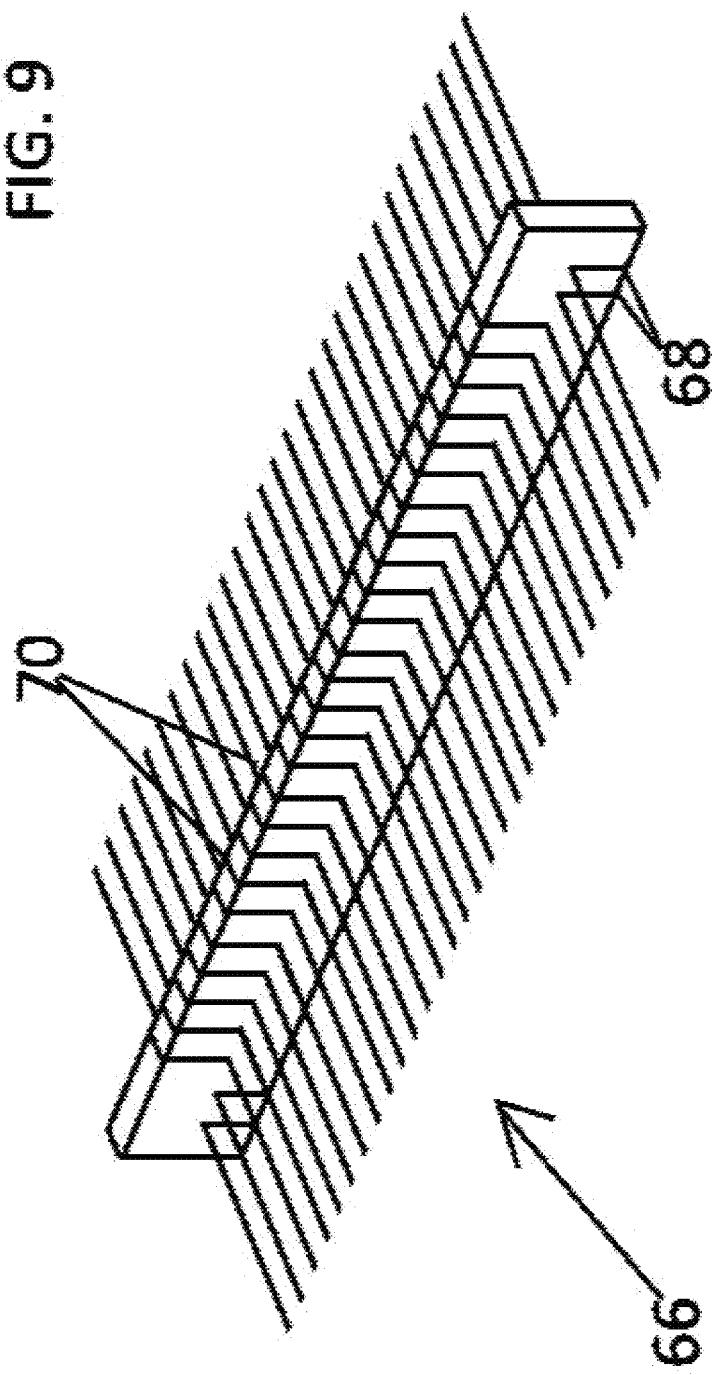

INTEGRATED SYSTEM FOR NANOFIBER PRODUCTION

PRIORITY CLAIM

This Utility Patent Application Claims priority benefit as a Continuation of U.S. Non-Provisional patent application Ser. No. 14/665,932, filed on Mar. 23, 2015, presently pending, the contents of which are hereby incorporated by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to nanofiber and nanotube production and more specifically, this invention relates to an integrated method and system for producing nanofibers and nanotubes.

2. Background of the Invention

Electrospinning, combined with appropriate heat-treatment of the as-spun fibers, is rapidly becoming a popular technology with a myriad of applications in many different fields and industries such as nano-, bio-, and tissue-engineering, filtration, clothing, electronics, sensors, energy, and drug delivery. Fibers/tubes with a nano-scale width (i.e., structures having morphological features smaller than one-tenth of a micron in at least one dimension) exhibit a high aspect ratio and provide a very large degree of anisotropy, which enhances energy transfer efficiency and other beneficial parameters. Energy transfer applications, such as thermoelectric, photoelectric, batteries, and RF/microwave applications will all benefit inasmuch as electrospun and heat-treated nanofibers/-nanotubes provide greatly superior characteristics compared to bulk materials.

Nanofibers and nanotubes, particularly those structures with dimensions between 10 nanometers (nm) and 1000 nm in diameter and between 50 nm and 1000 nm in length, are potential building blocks in the aforementioned endeavors.

No method is available for scalable low cost fabrication of nanofibers and tubes. Wet chemistry techniques are expensive, low yield processes which impose many limitations on materials that otherwise can be fabricated for certain geometries. Template techniques are slow and non-scalable, yielding less than 10 milligrams per batch.

Typical electrospinning processes produce nano-meshes instead of desired rods and yield less than 100 milligrams per batch. These conventional electrospinning methods, as well as newer high-output commercial methods, are highly non-automated in the steps required to produce metal oxide nanofibers. The deposition procedure (where the nanofibers begin to form from solution to target substrate), the heating procedure (in the case of producing metal oxide fibers where excess solvent is removed and the polymer decomposed) and the harvesting procedure (where the nanofibers are removed from the deposition substrate and collected) are performed independently with a high level of manual operation. This essentially separates nanofiber production into several batch processes, severely limiting fiber production rate and maintaining high labor costs. Secondly, when heat treating nanofiber material created by current production methods, randomly oriented nanofibers shrink in all directions, often curling up and contacting adjacent fibers. These shrunken, nonlinear fibers then fuse with each other, forming a solid mesh. This decreases the product quality drastically for applications requiring a high degree of anisotropy.

Other drawbacks to state of the art highly manual methods include large variations between batches. Also, current spikes associated with proportional-integral-derivative (PID) controlled AC power supplies found in many heating devices often destroy fibers as a result of large overshoots in temperature.

In summary, state of the art, current high-output electrospinning processes produce randomly oriented mesh which fuses with heat treatment or in the presence of humidity or solvent vapors. This results in a solid, low anisotropic weave. Heat treatment also oxidizes as-spun fibers, which leads to high exothermal heat release, thereby compounding the aforementioned fusing problems.

A need exists in the art for a method and system for economically producing high quality nanofibers and nanotubes. The method and system should integrate spinning, heat treating and collection processes. The method and system should allow for targeted morphology.

SUMMARY OF INVENTION

An object of the invention is to provide a method and system for producing nanofibers and nanorods that overcome many of the drawbacks of state of the art production techniques.

Another object of the invention is to provide an economical method and system for producing nanofibers and nanorods. A feature of the invention is that it automates fiber electrospinning to a deposition site, transport of that deposition site, and heating of that deposition site, all without moving the fibers from their initial deposition point. The fibers remain at their deposition point immediately prior to their collection. An advantage of the invention is that it obviates movement, handling and disruption of free fibers before thermal treatment permanentizes their morphology.

Yet another object of the invention is to provide a continuous method for producing nanofibers and nanorods. A feature of the method is that it provides a controlled deposition of high aligned nanofibers, whereby the ends of deposited fibers remain secured to deposition points during heating. An advantage of the invention is that the controlled deposition enables isotropic shrinking (e.g., shrinkage of fiber diameters) while maintaining targeted morphology, such as overall size (length), surface structure, and interior structure (longitudinally extending cavities from one end to another versus solid fiber centers). Controlled fiber deposition also results in controlled exothermic behavior.

An object of the present invention is to provide a method for automatically creating nanotubes. A feature of the invention is that controlled deposition of electrospun fibers results in spaces between deposited fibers such that even heating of the fibers is facilitated with air flow. An advantage of the invention is that the even heating causes polymer within the bulk of the fiber to boil or otherwise decompose, thereby leaving a void, resulting in nanotube formation. State of the art commercial electrospinning systems cannot avoid overlaps, therefore, even heating is not possible, resulting in nanowires being produced instead of nanotubes.

Still another object of the present invention is to provide a method for producing nanowires and nanotubes that maintains initial topographies, lengths and sizes of electrospun fibers. A feature of the invention is the utilization of a heating venue and technology that is thermally isolated from the electrospinning region while physically proximal to the electrospinning region. Another feature of the invention is a pneumatic collection mechanism situated proximal to the heating venue. An advantage of the invention is that electrospun fibers detach from their initial deposition venue substantially intact after heating and without contacting adjacent fibers prior to detachment. This isolation of separate fibers provides a means for eliminating the overlaying (or otherwise physical contact) of fibers with each other and unwanted formation of meshes while the fibers are being heated and transformed to tubes or wires.

Briefly, the invention provides a system for producing, continuously and not in batches, nanotubes, nanowires and nanorods. The system comprises a wire array shaped as a cylinder such that the cylinder defines a void; a first furnace positioned within the void; a second furnace positioned opposite the first furnace to define a channel adapted to receive a portion of the cylinder as the cylinder rotates about its axis; a means for depositing spun fiber onto the wire array as the cylinder rotates; and a means for removing the deposited fiber from the array after the deposited fiber is heated within the channel.

Also provided is a method for providing nanotubes, nanowires and nanorods in a continuous automated process as opposed to a multistep batch process. The method comprises supplying a cylindrical wire array, wherein the array defines an internal void; positioning a first furnace within the void; positioning a second furnace opposite the first furnace so as to define a channel between the first furnace and second furnace, the channel adapted to receive a portion of the cylindrical array as the array rotates about its axis; depositing spun fiber onto the array as the array rotates; heating the deposited fiber as it enters the channel; and removing the deposited fiber as it exits the channel.

BRIEF DESCRIPTION OF DRAWING

The patent or application file contains at least one drawing executed in color. Copies of this patent or patent application publication with color drawing(s) will be provided by the Office upon request and payment of the necessary fee.

The invention together with the above and other objects and advantages will be best understood from the following detailed description of the preferred embodiment of the invention shown in the accompanying drawings, wherein:

FIG. 1A depicts a single furnace fiber heating system, in accordance with features of the present invention;

FIG. 1B depicts a dual planar furnace heating system, in accordance with features of the present invention;

FIG. 3A is a view of FIG. 2 taken along line 3-3;

FIG. 3B is a backside view of FIG. 3A;

FIG. 4 shows detail of voltage supply to an individual needle, in accordance with the features of the present invention;

FIG. 9 depicts electrode separators, designated herein as combs, in accordance with features of the present invention.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides an integrated system and method that enables continuous automated production of metallic oxide nanorods/nanotubes/nanowires from electrospun nanofibers with targeted morphologies. The aspect ratios (length versus diameters of these annealed nanofibers range from between approximately 7 and 750, preferably between 50 and 300, and typically about 100.

A salient feature of the system is the use of cylindrical arrays of parallel metal wire electrodes. Deposition of electrospun fibers onto these electrodes results in consistent quality nanofiber with high anisotropy. Infrared (IR) furnaces (or other types of radiation exposure) allow for rapid and controlled heating and oxidation of the electrospun fiber, resulting in transformation of the fiber into metal oxide nanofibers/nanotubes with targeted morphologies. Upon transformation, the nanofibers/nanotubes are collected using a negative pressure system and also relying on gravity. The specifics of these separate processes are explained infra.

An embodiment of the invention uses a single radiation source while another embodiment uses a plurality of radiation sources.

Figure 1:
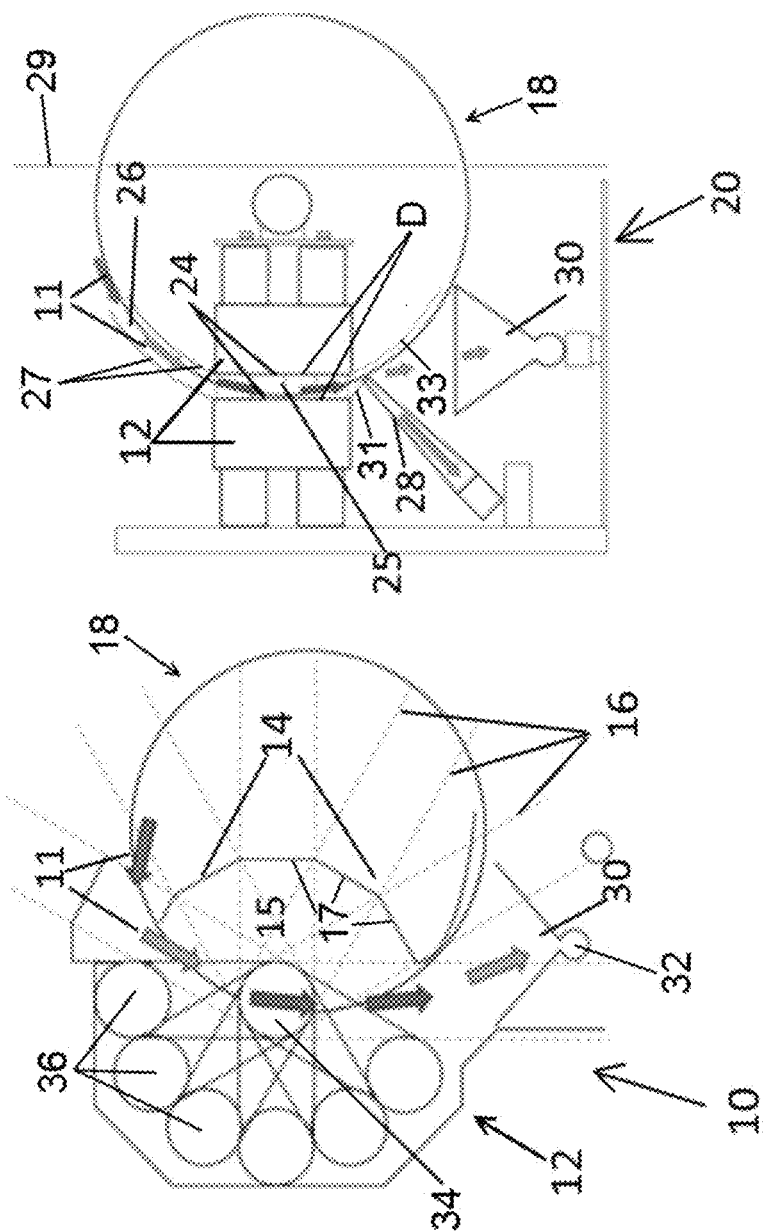
FIG. 1 depicts two systems for heating spun fiber, in accordance with features of the present invention.

FIG. 1A shows a single furnace fiber heating system, designated as numeral 10. FIG. 1B shows a dual planar furnace heating system, designated as numeral 20. Both systems facilitate tunable nanofiber production. FIG. 1A depicts a single infrared (IR) furnace 12 with a semicircular profile. This configuration heats the as-spun fiber 11 (depicted as bold arrows) with a shaped mirror 14 inside a cylindrical shaped wire array 18 to reflect IR energy 16 (depicted as dashed lines) back towards the fibers for multiple energy exposure passes. Heating of the fiber is controlled by varying the fiber speed through the zone, increasing deposition thickness, and modifying reflecting mirrors to channel air flow.

FIG. 1B depicts a double IR furnace configuration which optimizes fiber heating. The two furnaces depicted in FIG. 1B oppose each other thereby creating a heating zone 25 adapted to receive an arc of the array.

Optionally, the opposing surface of a first furnace situated laterally or outboard of the array is concave in shape while the opposing surface of a second furnace is convex. This results in the wire array passing through a concentrically shaped heating zone 25, thereby facilitating even heating of the fiber as it passes through the heating zone 25. This form-fit or concentric shape defines less volume than the heating zone 15 of the single furnace configuration depicted in FIG. 1A), therefore minimizing loss of energy. The even heating also produces consistent results from run to run. Even heating is further facilitated by increasing air flow through the heating zone. In an embodiment of the invention, the increased air flow removes heat generated during the approximately 280° C. exothermic reaction the nanofibers undergo.

The concentric feature of the double furnace design also provides a means for confining IR radiation to the heating zone of the wires, therefore minimizing any dissipation of energy to the rest of the system, to the reaction environment, or to the ambient environment. Generally, a suitable width of the heating zone 25 is one which is adapted to rotatably receive an arc of the wire array as the array rotates about its axis. An embodiment of the system defines a heating zone adapted to receive at least 15 degrees of the arc of the array at one time, preferably between 40 and 60 degrees, and most preferably about 30 degrees.

In an embodiment of the invention, the width of the heating zone is slightly wider or equal to the width "W" (see FIG. 3) of the deposition zone defined by the rotating array.

The system depicted in FIG. 1B provides a plurality of planar furnaces to irradiate different longitudinally extending surfaces of the same newly deposited fiber. In an embodiment of the system and method, these surfaces are heated simultaneously. This configuration creates the zone 25 of controlled heating from at least two directions while reflecting IR energy largely between two focusing mirrors 24 of the furnaces. These mirrors are situated behind the IR heating elements so as to define an exposed backwall or back stop of the heating element module.

Optionally, a preheating zone 26 is provided and defined by concave surfaces 27 positioned laterally from the entrance of the heating zone. (It is in this preheating zone where at least a first part of the aforementioned isotropic shrinking of the fibers occurs.) These concave surfaces may be reflective of the radiation used to heat the fiber. In the embodiment depicted in FIG. 1B, the topography of the concave surface 27 is complementary to the shape of the periphery of the rotating array with the radius of the concave surface larger than the radius of curvature of the rotating array. This results in the formation of the preheating zone 26 when the concave surface is positioned proximal to the array.

The invention also features shielding to isolate the electrospinning stage of the system from the heat treatment stage. The shielding blocks at least about 80 percent of the direct IR radiation that would otherwise directly irradiate, heat, or adversely affect the needles and precursor delivery lines. This shielding, depicted as numeral 29 in FIG. 1, minimizes or substantially prevents solution drying at the tip of the needles, therefor allowing for longer periods of uninterrupted production before routine cleaning occurs.

The shielding is defined by a web or substrate which deflects or otherwise prevents heat or other forms of radiation from traveling through it. As such, suitable type substrates include sheet metal, carbon fiber, wood, plastic, glass, composites, and combinations thereof. The plane defined by the substrate generally extends the height of the inside of the array.

Optionally, the substrate intersects an arc of the array like a chord such that the ends of the chord are the two intersection points with the cylindrical array. These intersection points are defined as latitudinally extending channels (e.g. horizontally disposed channels in the substrate) through which the arc of the cylindrical array can pass as the array rotates.

Shielding, along with the more efficient furnace arrangement results in a need for less overall power delivery, reducing the amount of energy loss to the immediate surroundings, such as a glove box. Positioning two furnaces with the radiation elements (e.g., IR lamps) facing each other assures that active cooling occurs through both faces of the heat zone, unlike using a primary reflecting mirror, with which any absorbed energy is radiated into the glove box.

Figure 8:
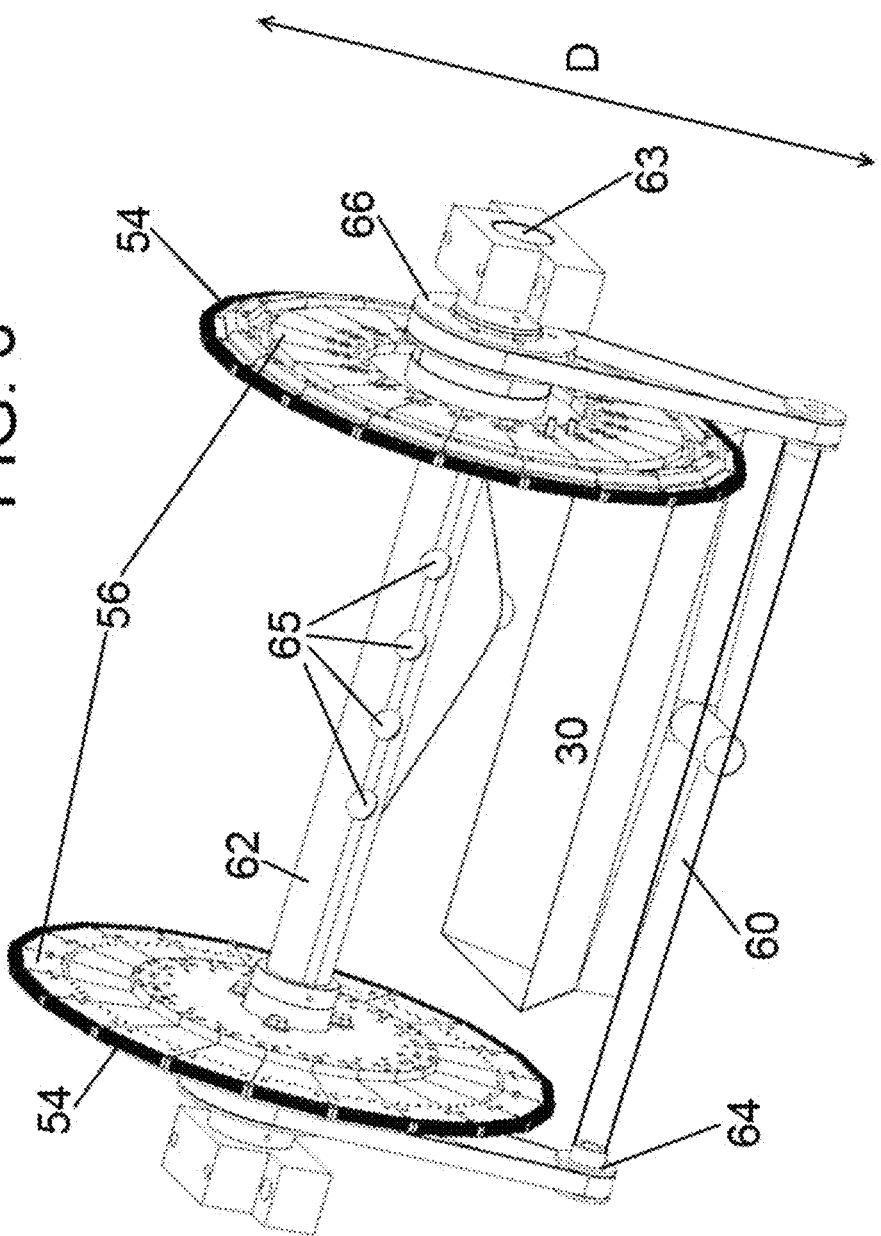
FIG. 8 shows detail of the drive mechanism for a wire electrode array, in accordance with features of the present invention.

FIG. 8 depicts a means for this active cooling of the interior heater, which is to say fluid ingress and egress conduits (such as tubes, not show) entering through the center 63 the hollow non-rotating axle 62 and exiting through one or a plurality of apertures 65 situated proximal to a heat exchange surface of the furnace positioned inside of the array 18. In an embodiment of the invention, the heat exchanger is in thermal communication with the mirrored backstop of each of the furnaces. (Portions of the vacuum collector 28 and trough collector 30 also are visible in FIG. 8.) Similar cooling means can be provided for the furnace positioned outside of the array.

The inventors found that the above shielding and furnace arrangement reduced energy requirements from 6-8 kW to less than about 2 kW, (i.e., a two thirds to three fourths reduction in energy input).

Operation Detail

Figure 2:
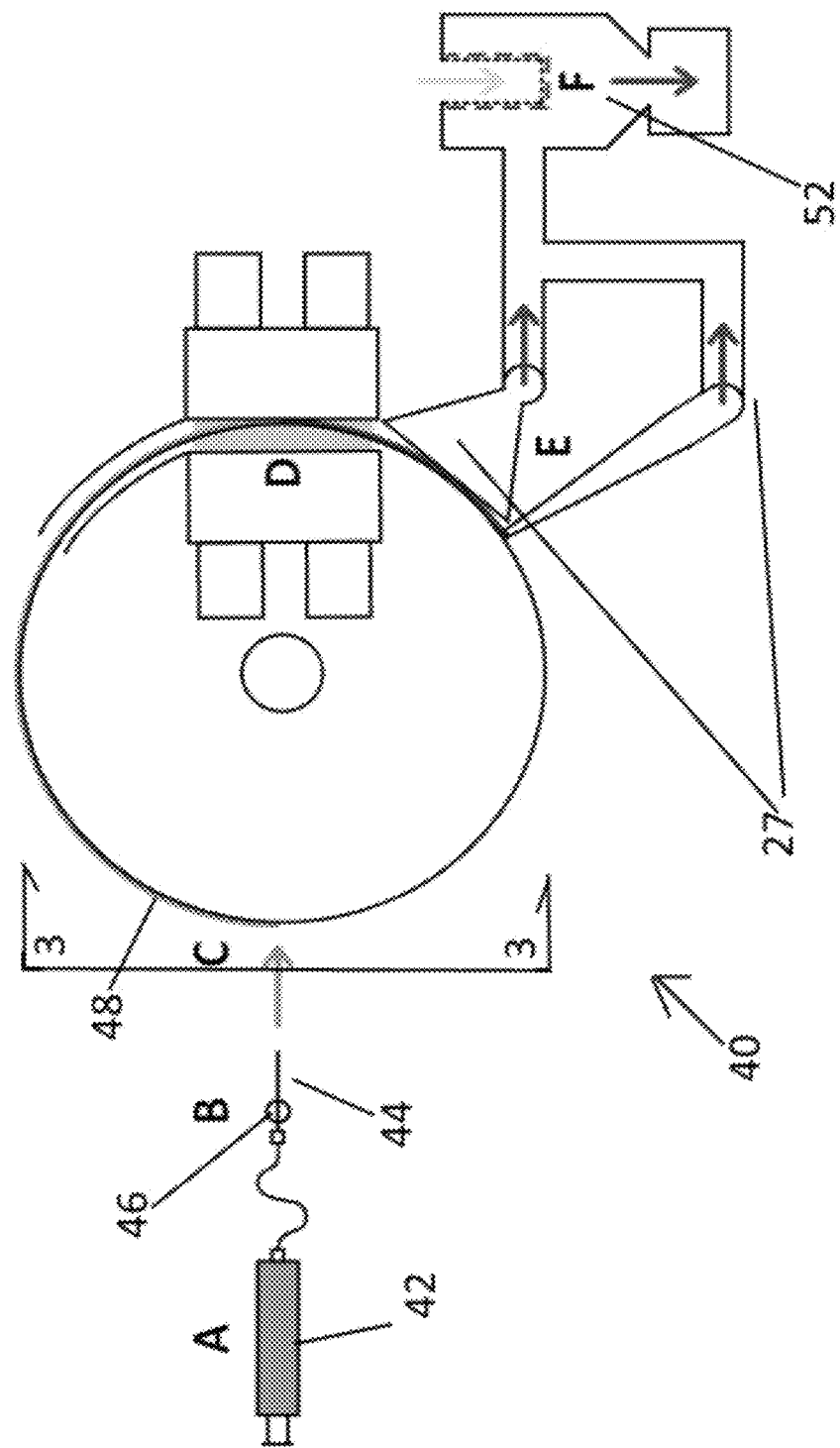
FIG. 2 illustrates an integrated system for electrospinning, IR heating, and pneumatic collection of nanofibers, in accordance with features of the present invention.

In operation, an embodiment of the invented system, designated as numeral 40 in FIG. 2, automates the electrospinning, irradiating (e.g. IR heating), and pneumatic collection (EIPC) of oxide nanofibers.

First, a plurality of multi-channeled syringe pumps 42 are charged with a fiber/tube precursor solution comprising solvent, dissolved metal salts, and dissolved polymer. The pumps 42 deliver the solution to a plurality of needles 44 secured to a high voltage distribution bar 46. Electrically generated static forces created by the high electric potential near the needle tips extracts polymer-containing fibers 45 from the needles for subsequent deposition to the cylindrical array 18 of parallel metal wires 49, so depicted in FIG. 3A.

The fiber initially extends in a straight line at approximately a 90 degree angle to the surface of the array, but soon turns nonlinear. It is not until the positively charged fiber establishes electrical communication with the grounded array that the fiber is deposited over the wire electrodes. (Alternatively, the array can be positively charged, with the fiber going to ground.)

Generally, the fiber is deposited over several or several hundred wire electrodes (wherein the electrodes are parallel to each other) often turning back and forth between the charged wires. FIG. 3A shows a single fiber deposited in a serpentine fashion such that its deposited regions are parallel to each other along adjacent electrodes. In an embodiment of the invention, deposition of several fibers is simultaneous. Each of the electrospun fibers initially gets laid as one continuous piece over dozens or even hundreds of pairs of wires, without any longitudinally extending portion of the fiber folding on top of, covering, or contacting another portion.

In order to remove remaining solvent and decompose the polymer resulting in metallic oxide fibers, the wire array rotates through a heating zone, such as two parallel opposed facing infrared furnaces. One furnace 12i is located on the inside of the cylinder, and another furnace 12o is laterally displaced relative to the first furnace so as to reside outside of the cylinder. The inside furnace 12i and outside furnace 12o are brought face to face as close as possible with the wires between them, reflecting the light between the two mirrors while minimizing the amount of radiation lost to the environment. This results in greater overall fiber absorption of IR radiation.

The distance between the furnaces can be adjusted so as to attain the targeted morphology of the fibers, the distance determined empirically. In an embodiment of the invention, the gap between the opposing faces of the two furnaces is between about 1 cm and about 5 cm, preferably between about 2 and about 4 cm, and most preferably between about 1.5 and about 2.5 cm. In another embodiment of the invention, the distance between the heating elements of the opposing furnaces is slightly wider than the diameter of the fiber-coated wires extending there through.

The power supplied to the furnaces, as well as rotational rate dictating time individual wires are exposed to the heating zone, control the extent to which the fiber is heated, allowing for varying degrees and rates of oxidation, making possible more precise targeting of different oxide fiber morphologies. Channeling of heated air prior to direct exposure to the furnaces provides a means for fine tuning of final nanotube or nanowire morphologies.

Also, and as discussed supra, providing increased air flow through the heating zone will result in more even heating of the fibers, favoring the formation of nanotubes instead of nanowires. In general, the air flow's primary function during tube formation is to remove excess heat generated by the nanofibers experiencing exothermic reaction while the tubes are heated above about 300° C. This air flow will prevent the fibers from overheating. Such airflow is determined empirically, depending on the solvents and polymers used, and the distance between the fibers and the furnaces. In an embodiment of the invention, an air flow of between about 50 and 150 ft/minute is suitable, and preferably about 100 ft/min.

Upon rotation into the heating zone, a portion of the array 18 is positioned between the two parallel infrared furnaces 12 so configured in FIG. 1B. The furnaces heat the electrospun fiber and remove residual solvent and decomposing polymer to produce oxidized metallic fibers or tubes. The temperature selected, and time of heat exposure will depend on the desired levels of oxidation and morphology sought for the fibers, as well as the tubes. As such, temperatures and heating times are empirically determined. Nanotubes are obtained from their respective precursor nanofibers after heat treatment (e.g., in air from about 425 to about 500° C. and from a time selected from about 15 minutes to about 1 hour. The temperatures, airflow rates, and exposure times are empirically determined. For example, in an embodiment of the invention, nanotubes formed when fiber was heated to about 450° C. for less than about 20 minutes.

After irradiation treatment (e.g. after the fibers are heated at a predetermined temperature and for a predetermined time), the nanotubes or nanowires detach from the electrodes, as seen in FIG. 3B. Inasmuch as some oxides become magnetic once the form above certain temperatures (e.g., approximately 400° C.), the nanotubes and nanowires are often found to be magnetized.

As is depicted in FIG. 3B, the length of each of the just produced tubes or wires is equal to the distance between the adjacent wires from which the tubes or wires detach. The length of the just produced tubes or wires is defined as the distance between a first end and a second end of the tube or wire wherein the first end is detaches from a first wire electrode and the second end detaches from a second wire electrode immediately adjacent the first wire electrode.

In summary of this point, fiber length and morphology are controlled based on the design of the electrospinning target. For example, and as discussed supra, a parallel wire target results in individual fibers of the same length as the distance between two adjacent and parallel wires serving as the grounded electrodes.

Solution Preparation and Deposition Detail

Fiber/tube precursor solution is prepared using a combination of organic solvents, salts and polymers to facilitate electrospinning action. Generally, solvents are polar, and the salts include, but are not limited to, nitrates, chlorides, isopropoxides, and combinations thereof. Exemplary solutions are found in the literature, including X. Chen *J. Phys. Chem C.* 2011, 115, 373-378, the entirety of which is incorporated herein by reference. This solution is delivered to the system via the multichannel syringe pumps 42. The process is linearly scalable based on the number of syringe pumps present. Each syringe terminates with a stainless steel blunt tip needle attached to an aluminum distribution bar. In an embodiment of the invention, the needles are contoured around a portion of the periphery of the array so as to be all substantially the same distance from the wire electrodes. There may be a degree of arc associated with the needle placement, or the needles may be situated along a single line across the width of the array.

Alternatively, different rows of needles can have an off-set in the horizontal direction. Off-sets exist when needles of a first horizontal row are laterally disposed (e.g. left or right) to needles of an adjacent second horizontal row above or below the first row. The distance of these off sets can be calculated by the needle distance in a row divided by the number of rows. This arrangement creates a uniform deposition of as-spun fibers on the wire electrodes. It provides a means for maximizing fiber deposition on given area of the wire electrode cylinder.

An experimental embodiment of the invention incorporates 36 needles defining the polymer deposition points. A high voltage power supply feeds the distribution bar which supplies voltage to all needles, minimizing the amount of wiring necessary, decreasing complexity and the likelihood of shorting. For example, given the relatively large number (36) of needles, it is preferred to have a stable and space efficient design for delivery of high voltages (up to approximately 30 KV per needle) required for the electrospinning process.

Electrospun fiber 45 is deposited tangentially to the wires 49, resulting in deposition of high anisotropy parallel with the direction of rotation, that direction depicted via the arrow in FIG. 3. The deposition characteristics compensate for the need of the deposition surface rotational speed to approximate the linear production rate of the electrospun fiber. This produces straighter, higher quality fiber with minimal multidirectional overlap and meshing. In an embodiment of the invention, the rotational speed of the array matches the linear production rate of the fiber. Generally, the array's rotational speed matches the rate the fibers are deposited onto the wires such that the density (e.g. weight) of the fibers are not too high to cause overlapping with themselves or adjacent deposited fibers.

Figure 4A:
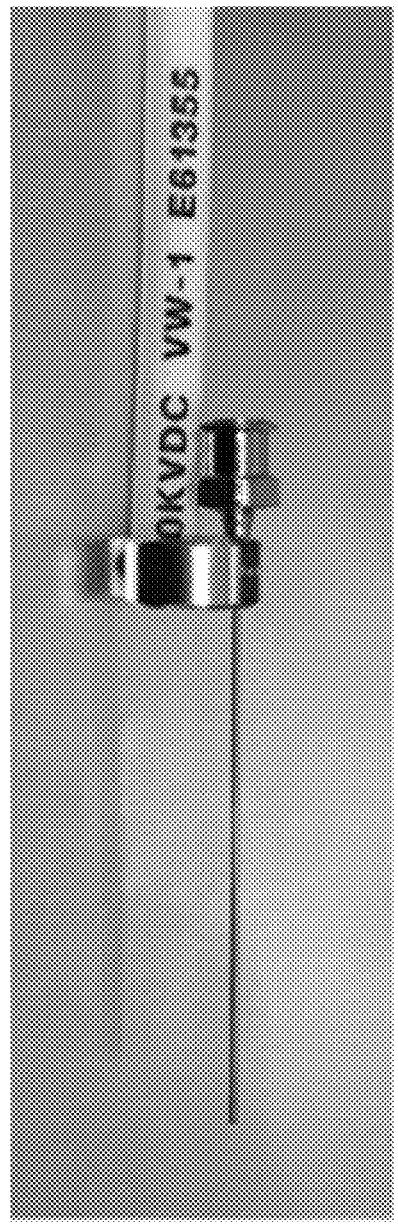
FIG. 4A is a plan view of a dispensing nozzle (e.g. a hollow needle) in electrical communication to a voltage source, in accordance with features of the present invention.
Figure 4B:
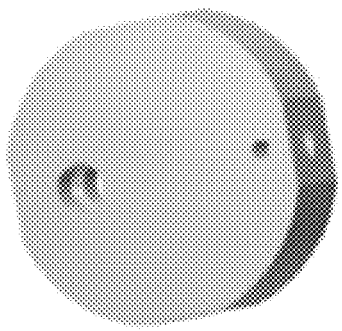
FIG. 4B is a perspective view of the substrate to facilitate electrical communication between a deposition needle and a voltage cable, in accordance with features of the present invention.

FIGS. 4A and B show detail of voltage supply to an individual needle. The electric field configuration for fiber deposition is defined by the positioning of wire electrodes relative to each other on the array and relative to the position of the needles maintained at voltage. The parallel ground wire electrodes, in the presence of the electric potential generated by the high voltages at the needles, generate the electric field for alignment. This configuration causes fiber deposition perpendicular to the direction of the metal wires.

Wire Electrode Detail

A feature of the invention is the use of parallel wire electrodes to produce discrete, straight ultra-thin nanofibers, all of the same size and length. The inventors have discovered that good quality fiber is obtained when thicknesses of the deposition onto the wire electrode is just a few layers of nanofibers, which occurs when one length of fiber is deposited over a previously deposited fiber.

An embodiment of the invention provides a method and device for producing discrete nanofibers with diameters less than 15 nanometers. The invention integrates electrospinning, heat-treatment and pneumatic collection of the nanofibers. A myriad of nanorods result, including, but not limited to those comprising iron oxide, cobalt oxide, nickel oxide, manganese oxide, barium oxide, nickel iron ferrite, nickel zinc ferrite, yttrium iron garnet, yttrium barium copper oxide and combinations thereof.

FIG. 3 is a view of FIG. 2 taken along line 3-3. FIG. 3 depicts a horizontal cylindrical array 18 of parallel metal wires 49 concentrically and circumferentially positioned with two hubs 50. This array 18 receives electrospun fiber 45 emanating from the syringe pumps 42.

The grounded object that receives the electrospun fiber is the horizontal cylindrical array 18 of parallel metal wires 48 strung between the two hubs. The wires, serving as electrodes for the system, are grounded 52 through the central hubs and out to a high voltage power supply 54.

Figure 5:
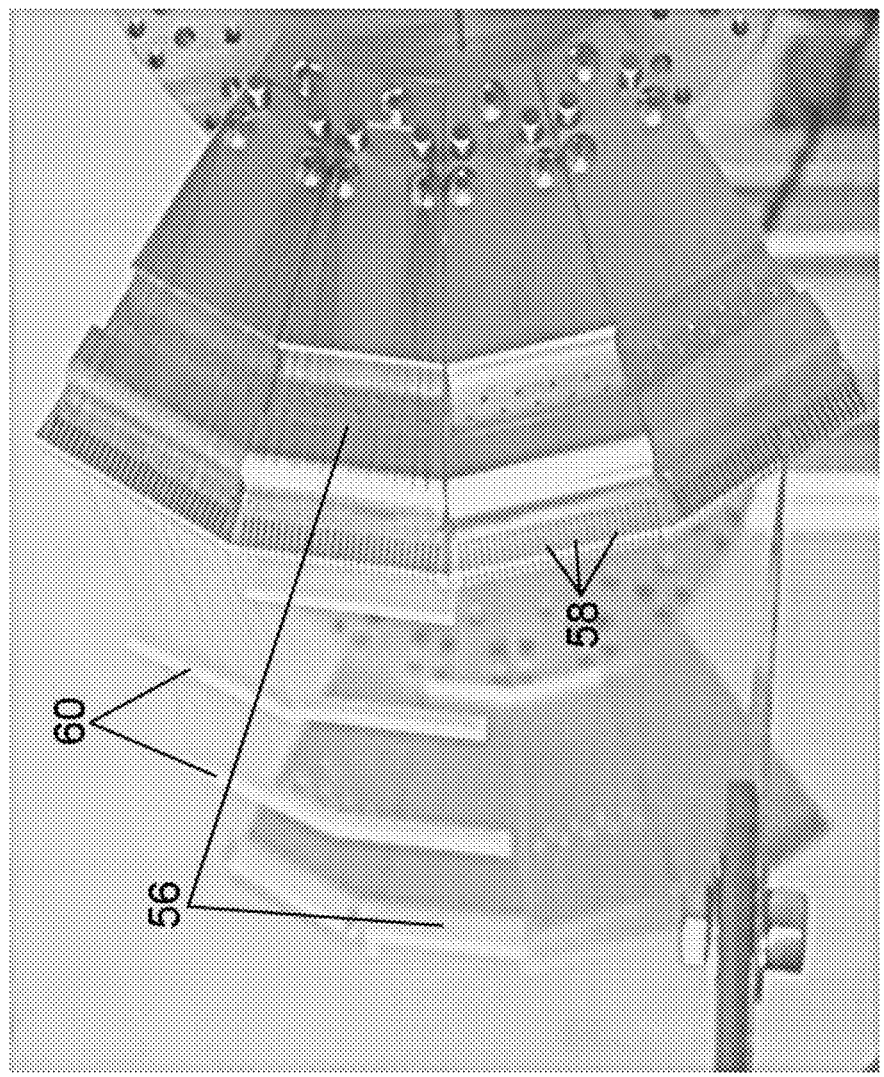
FIG. 5 is a perspective view of a portion of the wire array, in accordance with features of the present invention.

A feature of the wire electrode array is that all of the wire electrodes maintain tension throughout the deposition, heating and cooling cycles. This feature prevents shrinkage seen in state of the art fiber production processes. The invention continuously produces well aligned, individual nanofibers of less than 30 nm and thermally treat them so as to permanently fix specific morphology characteristics without out disturbance. In order to minimize the thermal expansion-induced loss of tension on the wires, and facilitate installation and maintenance process, the wiring of the entire wheel is broken down to 20 segments, each containing 19 wires extending parallel to each other across the width "w" of the wheel. As such, each of these segments represent about 18 degrees of arc of the circular array. An embodiment of the heating zone can fully encapsulate at least 18 degrees of arc, such that the heating zone can substantially surround at least one complete segment loading of wires. The use of furnaces with a wider arc of curvature can be utilized to heat more than one segment loading of wires. These segments, designated as element number 56, define pairs of opposing wedges as shown in FIG. 5.

A suitable wire electrode material is a metal with a low thermal expansion coefficient, (i.e., below approximately 5 $\mu m \cdot m^{-1} \; k^{-1}$) Such metals include, but are not limited to, tungsten, iron-nickel alloys (such as Invar, Super Invar, Kovar), iron-nickel-cobalt alloys such as Inovco, and combinations thereof, such that different wire races can be comprised of different metals. Invar is part of a family of low expansion iron-nickel alloys. Some metals in this family are Invar (%64 Fe, 36% Ni)—also known as Invar 36 or FeNi36, Superinvar (63% Fe, 32% Ni, 5% Co), and Kovar (54% Fe, 29% Ni, 17% Co). Inovco generally comprises Fe-33Ni-4.5Co.

Appropriate pins and slots 58 provide a means for locating each wire and maintain tension on it, and provide an attachment method to the wheel hub. With this structure, estimated thermal expansion for the temperature range in the example experiment, discussed infra, was less than 0.1 mm. With the wheel and hub design discussed in next section, tensioning device could be added in the future is necessary.

However, even with relatively high tension on the wire electrodes, they may be distorted due to the lateral contraction of nanofibers. Therefore, an embodiment of the invention features ceramic combs 66 placed between the wire electrodes to maintain even separation of the wires from each other. The combs are intercalated with the wires spanning the longitudinal extending portions of the array such that the combs are intercalated with wires and between opposing wedges. The ceramic comb configuration (depicted in FIG. 9) has a self-locking design whereby the outer most (laterally positioned) transversely extending sleds 68 extend in a direction opposite that of the medially placed sleds 70. This feature provides a fastening means such that the combs 66 do not fall off the wire arrays even when the arrays turn up-side-down as the wheel rotates. Along the wire length between the wheels, there are 4 combs per each pair of holders. The inner two combs have a low profile so that they are as little intrusive to the deposition electric field. The two outer ones are 3 times taller, and are intended to also serve as the edge cut-off to define the deposition area.

A salient feature of the invention is that the fiber is heat treated while still attached to the wire array, and immediately (e.g., less than about 5 minutes, preferably between about 15 seconds and about 3 minutes, and most preferably within about 60 seconds) after the fiber is spun. Not only does this expedite production of the fibers, but also assures continuity of fiber lengths, inasmuch as the heat treatment "fixes" the fiber lengths to the distance between the adjacent wire electrodes from which the fibers are suspended.

Another feature is that the wire electrodes from which the wires suspend are larger in diameter than the fibers. In an embodiment of the invention, the wires are no more than about 0.01 inches in diameter, preferably between 0.0025 and 0.008 inches in diameter, and most preferably between 0.005 and 0.006 inches in diameter. (In an embodiment of the invention, the wires are a magnitude of 10 larger in diameter than the fiber.) This assures an adequate electrical field strength while also a small radius of curvature to the electrode so as to facilitate relatively easier disengagement from the electrode during pneumatic harvesting of the fiber, (described infra) compared to blade shaped or flat shaped electrodes.

In an electrospinning paradigm, the fiber solution is extracted from the distal ends of the dispensing needles 44 by electrical forces, whereby once a threshold electric field strength is reached, the fiber extends from the Taylor cone located at the distal ends of the needles. However, in an embodiment of the invention, the charged fiber subsequently comes into electrical communication with the electric grounded wires such that longitudinally extending portions of the fiber simultaneously overlays several of the charged wires due to a voltage potential between the extruding fiber and the wire target.

Figure 6:
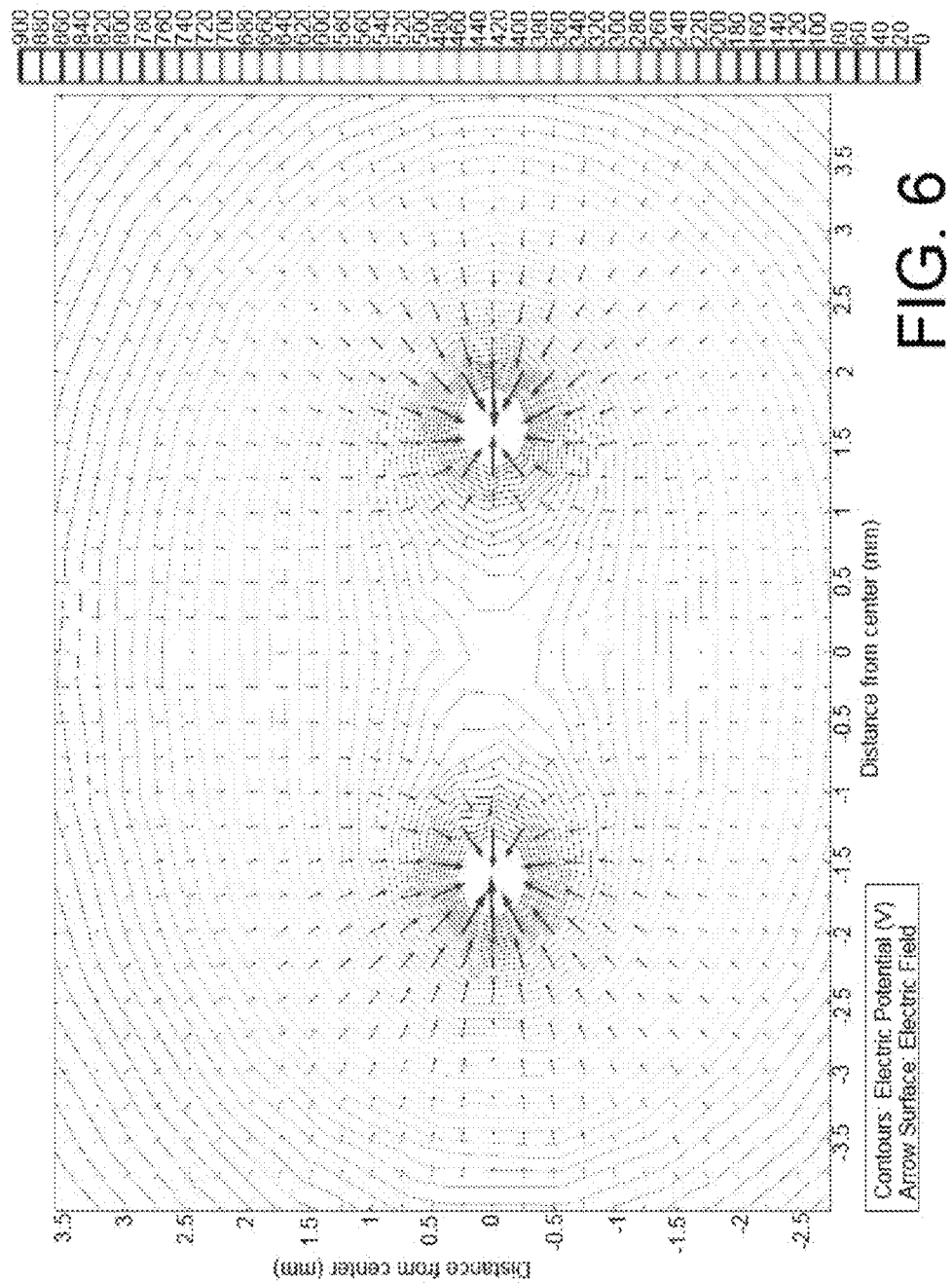
FIG. 6 is a schematic representation of the electrical forces surrounding two wire electrodes, in accordance with features of the present invention.

FIG. 6 depicts the electrical field surrounding two adjacent wire electrodes. The electrical field lines of force show bias towards each of the wires such that longitudinally extending surfaces of an electrically charged fiber extruded from the dispensing needles would migrate to the wires due to the electrical potential between the charged fiber and the wire. The values along the abscissa of the graph are the horizontal distances (in millimeters) from the center spot between the wires along the plane intersecting the two wires. Similarly the values along the left ordinate are the vertical distances (in mm) from the center spot between the wires.

The values along the right ordinate in FIG. 6 are the electrical potentials (measured in volts), with the red color representing higher potential than the violet colors. The light blue contour lines are the equipotential lines of force. FIG. 6 depicts the wire surfaces at zero voltage.

In an embodiment of the invention, the fibers are positively charged while the wire is at electric ground, and therefor at the lowest electrical potential. However, the reverse is also suitable such that the wire is at ground and the fibers are negatively charged.

Mirror Details

Embodiments of the invention utilize a comprehensive mirror system wherein mirrors and other reflective substrates are built or otherwise positioned around the openings of the IR furnace as well as the internal side of the wire wheel. Radiation (such as IR, UV, microwave, visual light, elevated temperature, laser light (to precisely fuse and then cut fibers off the electrodes) and combinations thereof) will be mostly confined inside the mirrored area and provide sufficient heating capacity for rapid heating of nanofibers.

In embodiments of the invention, reflecting mirrors are positioned behind the heating elements of the furnaces and positioned so that their surfaces reflect/redirect heat and/or other types of radiation toward the heating zone, even when those other types of radiation do not originate from within the heating zone.

In the single furnace system (e.g. FIG. 1A), the wheel rotation driving mechanism accommodates a static mirror surface 14 inside the wheel, allowing wires to continuously enter the space between the IR lamps and the inner mirror. This design also helps streamline the airflow used for pneumatic collection of fibers falling off the wire electrodes during heat-treatment, and will be discussed in detail in the following sections.

The mirror 14 of FIG. 1A comprises flat sections 17 corresponding to each incoming parallel IR radiation ray from each lamp unit 36 of the furnace. The mirror forms a concave surface that redirects radiation back to the focal area 34. This redirecting feature is similar to the closed IR furnace design featured in FIG. 1B, discussed infra, with two halves of the furnace opposing each other so as to reflect heat back to the focal area 34.

The configuration in the multi-furnace design (e.g. FIG. 1B) allows for direct, simultaneous heating and reflective heating of multiple surfaces of the fiber. As such, the multi-furnace design can be configured so that the fibers are directly heated by at least one furnace, directly heated by more than one furnace, directly heated by a first furnace with reflective heating provided by a reflective surface in close proximity to the first furnace (such that the fiber is positioned between the first furnace and the reflective surface), and directly heated by both furnaces while further heated by reflective surfaces. If reflective surfaces are positioned behind the heating coils such that the surfaces are removably attached or integrally molded with a housing of the furnace (s), one can turn off one of the furnaces, and just rely on its reflective surface to redirect radiation emanating from the opposing furnace.

Planar mirrors are used in combination with a large overall decrease in volume of the heating zone to minimize energy loss. Specifically, the mirrors 24 in the multi-furnace configuration are generally planar, parallel to each other, with their reflective surfaces opposing each other. (In previous design iterations, the large "chamber" created by the semicircular furnace and its concave reflecting mirror made channeling air flow to the heating zone a challenge.)

With the dual planar furnace design of FIG. 1B, the heating zone defines a linear, substantially straight channel to facilitate more easily directed air flow.

However, in an embodiment of the invention, auxiliary mirrors 27 extending from the ingress opening of the heating zone facilitates preheating of the fiber. This preheating zone 26 is defined by the size and shape of the mirrors. This preheating allows for increased heating efficiency, as well as tuning of the fiber oxidation for desired fiber characteristics. Unlike the mirrors situated substantially completely within the primary heating zone, the mirrors comprising the preheat zone are concave (in the case of the mirror situated lateral from or outside of the cylindrical array), convex (in the case of the mirror situated with the cylindrical array) or otherwise nonplanar. The reflective surfaces of the concave and convex mirrors oppose each other so as to form the preheating zone 26 through which the array traverses. The preheating zone derives heat from residual IR or other type of radiation which emanates from the primary heating zone or from some other source.

Mirrors 31, 33 situated proximal to the egress opening (e.g., the depending end) of the heating zone provide multiple functions, including directing detached nanotubes and nanowires to the aforementioned collection means 28, 30, and also protecting portions of the system from radiation emanating from the heating zone 25. One 31 of these proximally situated mirrors is substantially planar and extends downwardly from a bottom edge of the laterally placed furnace 12 to terminate at the opening of the vacuum collector 28. This mirror provides a means for directing detaching nanotubes and nanowires toward the vacuum collector 28 while also reflecting radiation back into the heating chamber 25. This mirror further protects the vacuum collector 28 from radiation otherwise saturating the chamber 25.

A second egress end mirror 33 is convex in topography relative to the direction its reflective surface is facing. This second egress end mirror 33 extends from a bottom end of the medially positioned furnace and terminates at a point proximal to the opening of the trough collector. This mirror 33 has a shape complementary to the interior shape of the cylindrical array and is positioned inwardly from the arc of the array so as to form an annular path through which the arc of the array traverses. This mirror serves to redirect radiation outwardly and away from the interior void of the wire array while also redirecting wayward detached nanotubes and nanowires from areas interior of the wire array and toward the trough collector 30.

Increases in overall efficiency conferred by the smaller heating chamber volume 25 conferred by the two furnace configuration also minimize exposure of IR radiation to sensitive components of the system. The configuration depicted in FIG. 1B therefore, obviates the need for an opposing curved reflective mirror or other bulky radiation reflection surface, such that no parabolic reflection surface need be positioned in front of the furnace. Rather, the two furnace system simultaneously facilitates direct and even heating of different surfaces of the fiber. In an embodiment of the invention, simultaneous multisided heating is done without curved reflective substrates residing within the heating zone 25 defined by the opposing surfaces of the furnaces.

Collection System Detail

After heat treatment, the pulse back system collects fiber continuously without disrupting production or processing. (In a pulse-back system, fibers are collected on a filter, and released to a collection vessel by temporarily reversing flow direction.) Operator interaction is minimized to providing precursor solution, selecting operating conditions for desired fiber morphology, and scheduled cleaning. A particular advantage conferred by the invention is the large scale production of stable individual, discrete nanotubes and fibers for subsequent incorporation into substrates requiring a high degree of anisotropy. The invention maintains the length of the fibers and tubes throughout the deposition, heating and collection processes.

A collection system 27 comprising the aforementioned vacuum collector 28 and the trough collector 30 facilitates harvesting of the oxide, and subsequently directing the oxide to an air cyclone where it is captured on a filter before being ejected into a collection vessel 52. In the single furnace iteration (FIG. 1A), a trough-like vacuum collector 30 is used to gather annealed fiber from the wire array. Optimal positioning of the collector will be determined empirically. For example, an embodiment of the invention has the collector 30 positioned beneath the array, off-center towards the heating zone. This is because most of the fibers fall off at the apex of the arc, i.e., at the center of the heating zone, due to gravity. However, with added air flow, the collector may need to be repositioned, given a certain amount of lofting of fibers from the array which may occur. Properly oxidized fiber falls off the wires and drops straight down towards the trough, where it is vacuumed into the collector. For this reason the collector is designed with a wide opening that tapers to a channel 32 at the bottom to collect material falling into the large cross-sectional area and funnel downwards.

In order to continuously remove the oxide fiber from the array without physically contacting and potentially damaging the electrode wires, the vacuum collection system is used to pull fiber off the wires via high velocity air flow. A narrow channel placed in close proximity to the wires pulls fiber into an air cyclone, where heavier masses settle out quickly into a collection vessel, and lighter masses become entrapped on a filter 52 (see FIG. 2) chosen for high permeability with a small pore size. FIG. 1B depicts this close proximity vacuum means as element 28.

In an embodiment of the invention, the depth "D" of the heating zone (i.e., the distance between opposing furnaces 12, is narrower than the depth (e.g., transverse opening width) of the pneumatic collection device. In another embodiment, the depth of the heating zone is wider than the transverse opening width of the pneumatic collection device. Also, the length of the heating zone, which is to say that dimension of the heating zone that parallels the longitudinally extending aspect of the wire array is less than the length (e.g., longitudinally extending length) of the opening of the pneumatic collection device 28.

A back pressure regulator monitors the pressure drop across the filter. After the establishment of a predetermined pressure drop, a pulse of pressurized inert fluid such as nitrogen gas, ejects fiber from the filter surface and into the collection vessel. In addition to the pressure sensor mode, the pulse can be timed or actuated manually.

FIG. 1B depicts the close proximity vacuum collector 28 to supplement the trough-style collector 30. The close proximity vacuum collector 28 facilitates removal of fiber that remains adhered to the wire after annealing. Often, fiber is unaffected by the weak pulling force of the single collector configuration (i.e., the trough 30) of FIG. 1A, and instead sloughs off the wire at a later point due to air currents and electrostatic forces within the glove box. Therefore, the close proximity vacuum collector actively pulls fiber from the wire array to facilitate greater product recovery (approximately 90 percent, compared to about 20 percent when a close proximity vacuum collector is not used), all without sacrificing quality. In an embodiment of the invention, the aspect ratio of the mouth of the vacuum collector is about 20.

The close proximity vacuum collector optimizes nanotube and nanowire collection, resulting in at least three times the amount of annealed fiber collected compared to if the trough-only collection system is utilized. The opening of the collector is a narrow channel with a high face velocity of air flow similar in velocity to a HEPA vacuum cleaner used to collect remaining nanofibers from the electrode wires. As such, an air flow of greater than about 5 meters per sec (m/sec) is suitable. In addition, it is considerably smaller and lighter than the previous collector. These combined features allow for placement of the collector in close spatial relationship to the exit of the heating zone, giving the collector the ability to vacuum annealed fiber (e.g. nanotubes and nanowire) immediately exiting the zone before it has time to be carried away by unintended or random air currents within the glove box. In an embodiment of the invention, the vacuum collector is positioned as closely as possible to the wire array, without touching the array. A suitable distance is one which accompanies the flexibility and inevitable nonconformity of the wire chases, such suitable distance being for example between about ¼ and ½ inch. The close proximity of the collector to the wire, combined with the high face velocity, create a much greater force pulling the fiber from the wire.

The vacuum collector 28 also facilitates air flow cross the wire array and through the egress point of the heating zone, thereby facilitating cooling of the fibers during collection. Generally, the inflow opening of the vacuum collector is wider than the heating zone. In an embodiment of the invention, "cooling" refers to the collector's ability to remove excess heat from the annealing fibers, that excess heat resulting from the exothermic reactions which facilitate the production of nanotubes and nanowires. This air flow can be tuned to optimize the production of more (or less) nanotubes, as described supra. The more rapid removal of exothermic-generated heat, the greater proportion of nanotubes produced. Conversely, slower removal of exothermic-generated heat results in more nanowires produced.

In an embodiment of the invention, in addition to implementing a new vacuum collector design for primary fiber collection, the trough collector 30 is also present in the system, and positioned below the vacuum collector 28. The trough collector is positioned similarly as before, that is below the array so as to partially utilize gravity, and partially to utilize negative pressure, to collect annealed fibers.

Instead of being connected to the pulse-back system, the trough serves as a secondary collection mechanism. In this configuration, the trough is in fluid communication with a dead filter vacuum in which accumulated fiber will be manually collected periodically. (The trough may also be connected to a pulse back system.) As such, in this embodiment, the vacuum collector 28 is positioned between the egress point (e.g., below a depending end) of the heating zone and above the upwardly-facing opening of the trough collector 30.

EXAMPLE

A solution comprising solvent (such as water, dimethylformamide, butyl 2-ethoxyethanol (aka butyl cellusolve), or isopropyl alcohol, or combinations thereof), iron and cobalt (e.g. nitrate) salts, and a polymer that allows for the electrospinning action. Suitable polymers include, but are not limited to polyvinylpyrrolidone (PVP), polyethylene oxide (PEO), polyvinyl acetate (PVA), polyethylene glycol (PEG), and block copolymers such as polystyrene-b-dimethyl siloxane.

The aforementioned chemical precursors delivered to 24 needles for electrospinning were fed by 6 or 12 syringes driven by 1 or 2 syringe pumps. A myriad of such pumps are commercially available, including but not limited to, the NE-1600 six channel syringe pump (New Era Pump Systems, Inc., Farmingdale, N.Y.). In an embodiment of the invention, total volume of precursor for one batch can be up to 600 mL. This is sufficient for over 10 days of continuous operation wherein about $4 \times 10^{12}$ cm of nanotubes or nanowires are desired to be produced. Syringe pumps are placed outside the reaction environment (e.g., a glovebox) for operation convenience as well as safety considerations (limiting the amount of flammable liquid inside the environment). The reaction environment does not necessarily have to be a glove box, as long as humidity (from zero to less than about 15 to 20 percent) and detritus levels are controlled. For example, fume hoods, negative pressure rooms, or ambient laboratory environments are also suitable.

The precursor fluids are supplied to the needles. Because the precursor solutions are conductive, high voltage applied at the needle will be transferred all the way along the precursor fluid body. Preferably, all tubing has suitable wall thickness (e.g., 1/16") for electrical insulation and prevention of dielectric breakdown. Syringes are either rated for high voltage, or shielded with Teflon film with similar 1/16" thickness.

A syringe pump allowed the material in the capillary to be replenished at a controlled rate of between about 0.3 and 0.6 mL per hour per syringe and most preferably about 0.4 mL/hour as it is extracted by electrical forces from the Taylor cone at the open end of the capillary. (It should be appreciated that the replenish rate or extrusion rate can vary, depending on the rotation speed of the array, thickness of the nanofiber, and ambient conditions. Generally, rates of between 0.1 mL/hour and 1 mL/hour are suitable.)

In an embodiment of the invention, the system is substantially encapsulated in a glovebox with a controlled relative humidity at or below 15 percent in order to promote the rapid evaporation of solvent from the fluid jet and to ensure the formation of a solid fiber prior to impact on the grounded wire collectors (i.e., electrodes).

FIG. 8 depicts an exemplary driving mechanism for the wire array. Pairs of wire holder wedges 56 (discussed supra) are mounted on two opposing array mounting wheels 54 so that the so positioned wheels and wires (not shown in FIG. 8) form a cylinder surface defining a diameter D. A drive shaft 60 is laterally disposed from the periphery of the cylinder so as to be parallel with a wheel mounting shaft 62, the wheel mounting shaft 62 collinear with the centers of the wheels. The drive shaft 60 defines a longitudinal axis and is adapted to coaxially receive two fixed drive shaft pulleys 64. Each drive shaft pulley 64 is in rotatable communication with a timing belt pulley, 66. Each of the timing belt pulleys 66 are rigidly and collinearly attached to its associated array mounting wheel. The aforementioned rotatable communication between the drive shaft pulley 64 and timing belt pulley 66 is effected via a timing belt 66, for example a belt made of Kevlar enforced neoprene or fiberglass enforced urethane.

In the embodiment depicted in FIG. 8, two sets of pulleys turn the two wheels such that there is a dedicated drive shaft pulley-timing belt pulley for each wheel. As such, the center mounting shaft 62 is static while the two wheels 54 rotate freely. The internal mirror described supra is attached to the mounting shaft. Alternative to this configuration, the center mounting shaft is rigidly attached to the two array mounting wheels, and the center shaft itself is actuated by a stepper motor.

A 24 VDC 11.88 in-lbs NEMA 23 stepper motor and 1:10 ratio speed reduction gearbox is utilized to rotate the driving shaft 60. Combined with a 1:4 speed reducing ratio in the timing belt pulley system, the system can provide at least 2 g maximum acceleration at the position of the wire electrodes. This capability of high acceleration would be useful in one of the driving modes wherein the wheel rotates with rapid start and stop steps. This action creates mechanical shaking to help heat-treated fibers dislodge from the wire electrodes for harvesting by the pneumatic collectors.

The wheel rotates at a slow rate of about two revolutions per hour; however, this rotation rate is empirically determined, depending on the production rate desired and the radius of curvature of the cylindrical array. When wire electrodes are in the deposition zone, facing the needle array, as-spun fibers are deposited on to the wire electrodes (such that the spun fibers are draped over and therefore suspended between the wires). After the array rotates out of the deposition zone, the as spun fibers suspended on wire electrodes are carried into the drying zone which begins proximal and medially disposed from the heat shield 29 in the direction of rotation. The drying zone ends where the flanking concave reflective preheating surface 27 begins. This optional drying zone allows evaporation of solvents before entering the IR heating zone.

Upon rotating out of the drying zone, the array (and therefore the drying fibers) rotates into the heating zone. In an experimental embodiment of the single furnace iteration of the invention, a water-cooled tubular IR furnace was modified to be the heating element, such that the furnace was opened up along its hinge to enclose the large diameter of the wire array wheel. Such furnaces are commercially available, such as the 24KW Ulvac-Riko RHL-P1210CP (Ulvac-Riko, Inc., Kanagawa, Japan). In this configuration, the twelve internal light bulbs housed by the furnace face the rotating cylinder opposite of the needle array.

In another embodiment of the invention, whereby two furnaces are utilized, a relatively more compact furnace is utilized for the heat source, for example, positioned within the confines of the wire array. Such compact furnaces are commercially available, such as the Ulvac-Riko RHL-P5310V, also from Ulvac-Riko.

A computer controlled DC power supply provides steady power outputs that are more suitable for the nanofibers in that current spikes are eliminated. These power supplies are commercially available. A suitable power supply is the TDk-Lambda Genesys 5KW DCPS, one powering each bank of the IR lamps so as to provide independent control of the two halves of the heating zone. This provides a combined effective maximum power output of 8KW. This provides a one-to-one correlation for sample temperature and IR power. No real time temperature sensing in the control loop is necessary. Preferably, temperature sensing is used only for monitoring and calibrating.

The IR lamps heat up the as-spun nanofibers rapidly (e.g., within about 5 to about 120 seconds As the wire electrodes carrying nanofibers rotate through the heating zone, fiber temperatures will reach about 320° C., at which point they start to detach from the wire electrodes and fall off. In an embodiment of the invention, fiber lengths correspond to the distance between the immediately adjacent wires over which the fibers are draped or suspended.

When the as-spun nanofibers are heated in air, the presence of nitrate ions facilitates the initiation of the PVP oxidation. For comparison, the decomposition of pure PVP in air has generally been observed to take place at higher temperature and with a smaller heat release than that in the first exotherm observed in the inventors' measurements. This substantiates the role of the nitrate ion as an oxidant.

As thermal decomposition and the volatilization of the decomposition products progresses, metal oxide clusters start to form on the fiber surface where metal ions are in contact with ambient air. (By way of comparison, when an as-spun Fe(III) sample was heat treated in argon, pure metal formed instead of metal oxide.) These metal oxides form small aggregates as the fiber diameter continues to decrease until they assemble into a rigid shell. The close association between the mass loss and fiber diameter reduction over this temperature range indicates that the fibers remain solid. This also suggests that the degradation of PVP into volatile decomposition products occurs at the surface where $Fe_2O_3$ nanocrystals accumulate and aggregate, eventually leading to the formation of a rigid $R-Fe_2O_3$ network. Once the oxide shell forms, the fiber diameter stops decreasing, while the removal of additional PVP drives the remaining metal ions toward the surface. Polymer (e.g., PVP) is completely removed at around 475° C. where the formation of oxide nanotubes is completed.

A preferable condition for nanotube formation is that an oxide shell forms before the removal of PVP is complete (i.e., prior to the second exothermic heat flow peak arising from the final decomposition measurement). This observation provides an appropriate heat treatment protocol for reliably and reproducibly converting as-spun fibers to nanotubes. In particular, the heating rate and thermal anchoring of samples must be designed to minimize sample overheating due to the considerable heat produced during the exothermic oxidation of PVP. If the sample heating rate is too rapid and/or if the thermal anchoring of the sample to its environment is insufficient, sample overheating can lead to the overlap of the oxide shell formation and polymer removal processes. In these cases, poor quality nanotubes result. In extreme cases, oxide nanofibers rather than nanotubes are produced.

Figure 7:
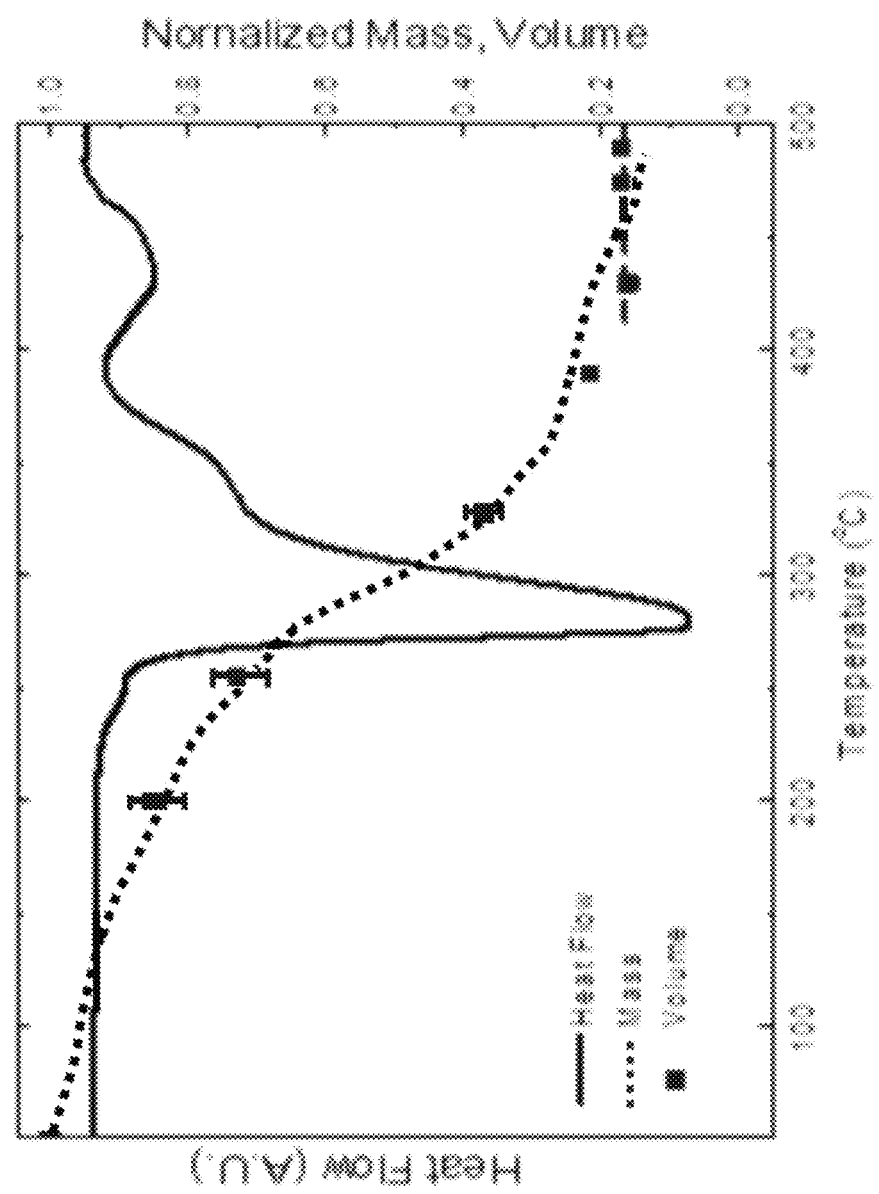
FIG. 7 depicts a multistage versus single stage heating profile, in accordance with features of the present invention.

The invented system is unique for being able to produce either nanorods or nanotubes, or both simultaneously, depending on temperature flux. FIG. 7 illustrates the heat flow phenomenon responsible for formation of primarily nanotubes using the invented system. Power compensated differential scanning calorimetry (DSC) and heat flux DSC/ thermographic analysis (TGA) measurements were carried out on as-spun Fe(III) containing nanofibers to illustrate the preferred heating profile for nanotube formation.

FIG. 7 exhibits two well-resolved exothermic signals, and the power compensated DSC result. The first peak centered at about 300° C. corresponds to an energy release of about 10.5 kJ/g and the second centered at about 450° C., corresponding to an energy release of about 1.1 kJ/g. The first signal is the first exotherm, discussed supra. The second signal is a second exotherm. Between approximately 400° C. and 500° C., the fibers continued to lose mass but maintained volume. This is indicative of tube formation between these temperatures.

The inventors have found that the most common condition for nanofiber formation is when the first and second exotherms merge due to high exothermic reaction temperatures, ranging from about 280° C. to about 300° C., rapidly heating the fibers beyond the 400 C point where tube formation is optimized. The exothermicity of the polymer-fiber reaction causes the construct to rise quickly above 450° C., resulting in outgassing of the interior of the fiber through its longitudinally extending exterior surfaces instead of through its two ends.

In summary, the aforementioned feature of providing airflow through the reaction/heating zone prevents such overheating and outgassing through the fiber's longitudinally extending walls, and instead promotes decomposition and outgassing of the interior of the fiber out of its two ends, resulting in the production primarily of nanotubes. A consequence of this discovered feature is that airflow can be regulated in situ to produce nanotubes first, then nanofibers, or vice versa.

A myriad of temperature detection and control systems can be utilized, as modified by the inventors. IR sensors with relatively small spot sizes (e.g., 3 mm) provide a means to accurately detect temperatures on the nanofibers suspended between the wire electrodes. Preferably, the sensors are placed on X,Y,Z staging systems such as those available through Newport Corporation, Irvine, Calif.

Alternatively, an IR thermal camera can be utilized to detect temperatures. Spatial resolutions of 1 mm with large (e.g., 3" by 7") detection areas are suitable. These attributes eliminate the need for the aforementioned staging systems recommended with IR sensor configurations. In an embodiment of the invention, the camera is positioned outside of the mirror system with a cut out on a side mirror to serve as a detection window.

The pneumatic fiber collecting system 28, and the collecting chute 30 placed between the lower edge of the furnace and the bottom of the wheel (the collecting zone) harvests the fibers falling off the wire array for subsequent collection in a vessel. After the collecting zone, wire electrodes enters a final cleaning zone to remove remaining fibers sticking on the wires (those with poor quality) before they continue rotating and reentering the deposition zone. The system is designed to be continuously operating for up to a week without the need of operator intervention.

An embodiment of the pneumatic fiber collection system comprises components both inside and outside the glovebox. As the fibers fall off the wire during heat treatment, they are directed into a collection trough 30 (the "harvester") using suction from a blower that is located outside the glovebox. The blower inlet and outlet are fed through the glovebox to maintain a closed system. The trough is designed to cover the expected area in which the fibers will fall and to maximize collection rate. Conduit, such as one-inch tubing then directs the collected material to the inlet of a modified cyclone baghouse, where the fibers will be trapped. With the assistance from a pulse-back system (described later), fibers fall into the removable collection chamber.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those skilled in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for continually producing nanotubes and nanowires, the system comprising:
    a) a wire array shaped as a cylinder such that the cylinder defines a void;
    b) a first furnace positioned within the void;
    c) a second furnace positioned opposite the first furnace to define a channel adapted to receive a portion of the cylinder as the cylinder rotates about its axis;
    d) a dispenser for depositing spun fiber onto the wire array as the cylinder rotates; and
    e) a collection device for removing the nanotubes and nanowires from the channel.

2. The system as recited in claim 1 wherein the wire array is electrified.

3. The system as recited in claim 1 wherein the first and second furnaces are IR radiation sources.

4. The system as recited in claim 1 wherein the spun fiber comprises a polymer selected from the group consisting of polyvinylpyrrolidone, polyethylene oxide, polyvinyl acetate, polyethylene glycol, block copolymers and combinations thereof.

5. The system as recited in claim 1 wherein the means for depositing fiber comprises:
    a) a supply of a polymer mixture; and
    b) an electrical potential between the polymer mixture and the wire array.

6. The system as recited in claim 1 wherein the nanotubes are between approximately 15 nm and 500 nm in diameter.

7. The system as recited in claim 1 wherein the nanotubes are separately produced from each other.

8. The system as recited in claim 7 wherein the tubes remain separate from each other during heating and harvesting.

9. A method for continuously producing nanotubes or nanorods, the method comprising:
    a) supplying a cylindrical wire array, wherein the array defines an internal void;
    b) positioning a first furnace within the void;
    c) positioning a second furnace opposite the first furnace so as to define a channel between the first furnace and second furnace, the channel adapted to receive a portion of the cylindrical array as the array rotates about its axis;
    d) depositing spun fiber onto the array as the array rotates;
    e) heating the deposited fiber as it enters the channel so as transform the fiber into a nanotube or nanorod; and
    f) removing the nanotube or nanorod from the array as it exits the channel.

10. The method as recited in claim 9 wherein the step of depositing spun fiber further comprises establishing an electrical potential between the spun fiber and the wire array.

11. The method as recited in claim 9 wherein the deposited fiber is exposed to radiation selected from the group consisting of infra red, ultra violet, visible light, laser light, and combinations thereof.

12. The method as recited in claim 9 wherein the nano tubes are between approximately 15 nm and approximately 500 nm in diameter, and the walls of the nanotubes are between 5 and 100 nm thick.

13. The method as recited in claim 9 wherein the nanotubes remain as separate entities during deposition, heating and removal.

14. The method as recited in claim 9 wherein the nanotube or nanorod has a first end connected to a first wire on the array, and a second end connected to an adjacent second wire on the array.

15. The method as recited in claim 14 wherein the length of the nanotube or nanorod is approximately equal to the distance between the first wire and adjacent second wire.

16. The method as recited in claim 14 wherein the removing step further comprises the nanotube or nanorod disengaging from the first wire and the second wire such that the nanotube or nanorod has a length approximately equal to the distance between the first wire and the second wire.

17. The method as recited in claim 11 wherein the fiber is heated while attached to the array.

18. The method as recited in claim 11 wherein the heating stops before nanotube or nanorod is removed from the array.

19. The method as recited in claim 16 wherein negative pressure facilitates disengagement of the nanotube or nanorod from the first and second wires.

20. The method as recited in claim 9 wherein the spun fiber comprises polymer and the tube is formed before the polymer substantially completely evaporates during heating.

\* \* \* \* \*